(12) United States Patent
Riegger et al.

(10) Patent No.: US 11,318,822 B2
(45) Date of Patent: May 3, 2022

(54) SHADING DEVICE FOR A MOTOR VEHICLE, GUIDE RAIL, VEHICLE ROOF AND MOTOR VEHICLE

(71) Applicant: Webasto SE, Stockdorf (DE)

(72) Inventors: Marian Riegger, Stockdorf (DE); Bernhard Braun, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 0 days.

(21) Appl. No.: 17/055,193

(22) PCT Filed: May 14, 2019

(86) PCT No.: PCT/EP2019/062336
§ 371 (c)(1),
(2) Date: Nov. 13, 2020

(87) PCT Pub. No.: WO2019/219677
PCT Pub. Date: Nov. 21, 2019

(65) Prior Publication Data
US 2021/0146760 A1 May 20, 2021

(30) Foreign Application Priority Data
May 15, 2018 (DE) ...................... 10 2018 111 548.2

(51) Int. Cl.
*B60J 7/00* (2006.01)
*B60J 1/20* (2006.01)

(52) U.S. Cl.
CPC ........... *B60J 7/0015* (2013.01); *B60J 1/2052* (2013.01)

(58) Field of Classification Search
CPC ....... B60J 7/0015; B60J 1/2052; E06B 9/581; E06B 9/58; E06B 9/40; E06B 3/67
(Continued)

(56) References Cited

U.S. PATENT DOCUMENTS 8,690,234 B2 * 4/2014 Rockelmann .......... B60J 7/0015
296/214
9,038,699 B2 5/2015 Bergmiller et al.
(Continued)

FOREIGN PATENT DOCUMENTS

DE 202008014460 U1 * 1/2009 ............... E06B 9/17
DE 102010018259 A1 10/2011
(Continued)

OTHER PUBLICATIONS

Kunststoffverarbeitungs, "Extrusion profile with brush strips for the construction of roller shutters, sun protection curtains, doors or windows", Feb. 26, 2009, German Patent Office, Edition: DE202008014460U1 (Year: 2009).*
(Continued)

*Primary Examiner* — Dennis H Pedder
*Assistant Examiner* — Joyce Eileen Hill
(74) *Attorney, Agent, or Firm* — Fitch, Even, Tabin & Flannery, LLP

(57) ABSTRACT

A shading device for a vehicle, having a roller blind web and a winding shaft for winding unwinding the roller blind web in an extension direction. The guide rails are arranged opposite one another and each have a guide channel extending in the extension direction, wherein the roller blind web is guided in a displaceable manner in the extension direction on opposite sides in the guide channels of the guide rail while being wound and unwound and extends between the guide rails such that the roller blind web is guided out of each guide channel along a deflection region in the direction of the respectively other guide channel, wherein the roller blind web bears on the associated guide rail in the respective deflection region, wherein in that each guide rail is configured in the deflection region such that at least partial linear contact is formed by the roller blind web.

11 Claims, 3 Drawing Sheets

(58) Field of Classification Search
USPC ............................. 296/216.01, 216.08, 214
See application file for complete search history.

(56) References Cited

U.S. PATENT DOCUMENTS

| | | | |
|---|---|---|---|
| 2005/0073175 A1* | 4/2005 | Breuer | ................... B60J 7/0015 296/214 |
| 2011/0122737 A1 | 5/2011 | Shimazawa et al. | |
| 2013/0038092 A1 | 2/2013 | Rockelmann et al. | |

FOREIGN PATENT DOCUMENTS

| | | |
|---|---|---|
| DE | 202014103268 U1 | 7/2014 |
| DE | 102014005475 A1 | 10/2015 |
| EP | 2004430 B1 | 10/2012 |
| EP | 2679422 A1 | 1/2014 |
| EP | 3301250 A1 | 4/2018 |
| WO | 2010063312 A1 | 6/2010 |

OTHER PUBLICATIONS

International Search Report for PCT/EP2019/062336 dated Aug. 28, 2019 in English and German (5 pages).
Written Opinion of the ISA for PCT/EP2019/062336 dated Aug. 28, 2019 in German with English machine translation (9 pages).

* cited by examiner

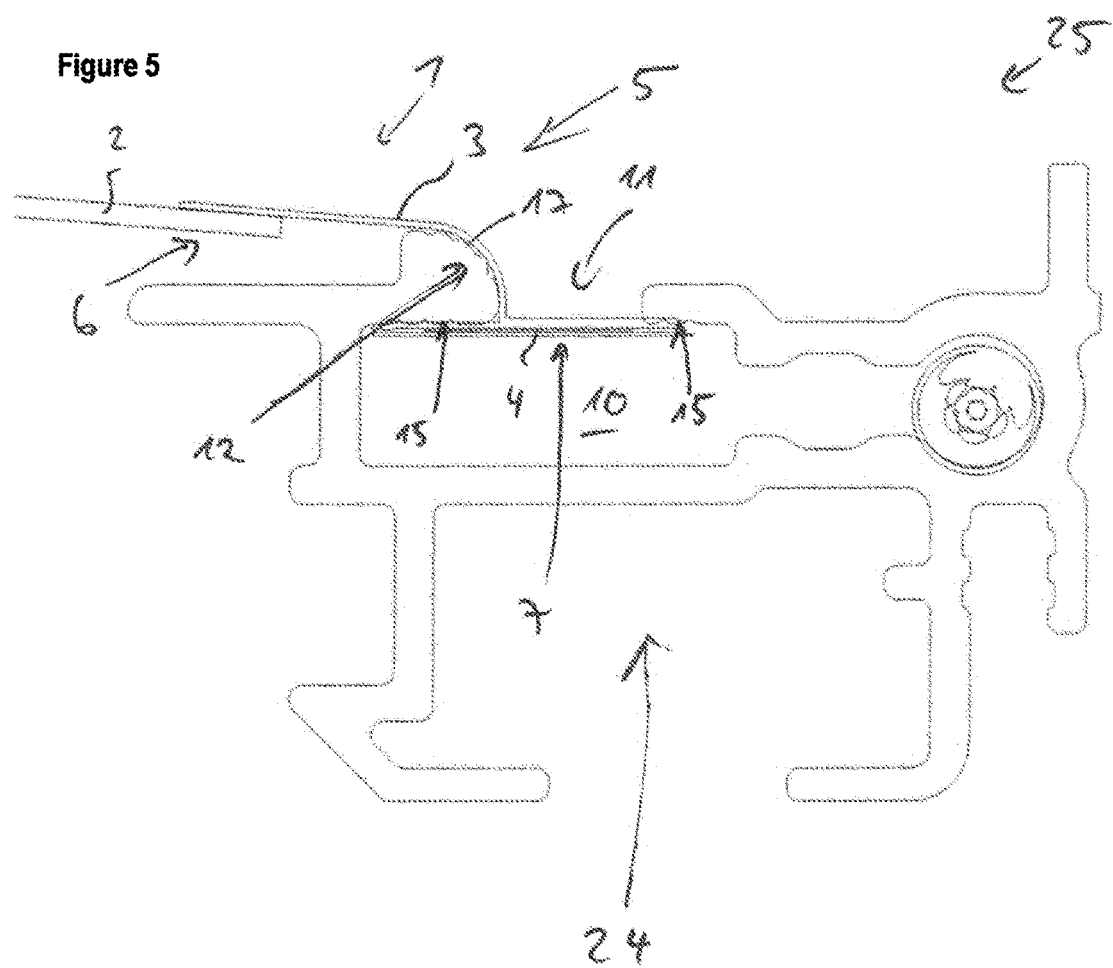

SHADING DEVICE FOR A MOTOR VEHICLE, GUIDE RAIL, VEHICLE ROOF AND MOTOR VEHICLE

CROSS-REFERENCE TO RELATED APPLICATIONS

This application is a U.S. national phase application filed under 35 U.S.C. § 371 of International Application No. PCT/EP2019/062336, filed 14 May 2019, designating the United States, which claims priority from German Patent Application No. 10 2018 111 548.2, filed 15 May 2018, which are hereby incorporated herein by reference in their entirety for all purposes.

FIELD

The invention relates to a shading device for a vehicle. The invention also relates to a guide rail for a shading device, to a vehicle roof and to a vehicle.

BACKGROUND

Shading devices (also known as roller blind arrangements) having roller blind webs for use in a vehicle are known from the prior art. Such shading devices serve to protect against solar radiation under a transparent roof section of the vehicle. For example, this can be a panoramic glass roof or a sunroof. Typically, the roller blind web is tensioned in an extension direction, more or less the vehicle longitudinal direction. In addition, the roller blind web is also tensioned transversely to the extension direction in order to avoid any sagging of the roller blind web and flapping or vibration thereof. Such a roller blind arrangement is known for example from EP 2 004 430 B1.

SUMMARY

An object on which the present invention is based is to specify a concept for a shading device that contributes toward precise and in particular low-noise operation.

According to one aspect, a shading device for a vehicle is disclosed. The shading device has a roller blind web and a winding shaft for winding up and unwinding the roller blind web in an extension direction. The shading device has guide rails that are arranged opposite one another and each have a guide channel extending in the extension direction. The roller blind web is guided in a displaceable manner in the extension direction on opposite sides in the guide channels of the guide rail at least while being wound up and unwound and extends between the guide rails such that the roller blind web is guided out of each guide channel along a deflection region in the direction of the respectively other guide channel, wherein the roller blind web bears on the associated guide rail in the respective deflection region. Each guide rail is configured in the deflection region such that at least partial linear contact is formed by the roller blind web.

Partial linear contact or linear support means that the roller blind web bears on the guide rails in the deflection regions at least partially in the extension direction along one or more lines. In other words, linear support means that the deflection region is configured in terms of its shaping such that the roller blind web bears at least partially on regions of the guide rail with a cylindrical or round shape and thus flat, in particular extensive or smooth, contact is avoided. The term linear support also includes instances of surface support that are not discernible with the naked eye. In other words, minimal, for instance microscopic instances of surface support are included by the term. Embodiments are also included in which the roller blind web for example at least partially molds itself around small wave regions. Broadly speaking, the roller blind web is not intended to bear fully on the guide rail in the deflection region. The linear support takes place along the guide rails, more or less in the extension direction.

As a result of corresponding shaping of the deflection regions, typically provided surface support is converted at least partially, for instance locally, into linear support. As a result, point pressure changes in the deflection region between the guide rail and roller blind web, for instance the contact surface or the contact region. This has the result that, when the roller blind web is wound up and unwound, the friction changes and is excited in a different rubbing frequency. This contributes considerably toward reducing or even avoiding noise emission. In particular, this contributes toward avoiding squeaking when the roller blind web is wound up and unwound.

A number of conceivable solutions arise for the specific configuration of the deflection regions.

For example, the deflection region of each guide rail has a wavy profile or a grooved profile. Alternatively or in addition, the deflection region of each guide rail has a profile that is formed at least partially by alternately arranged grooves and waves. Alternatively or in addition, the deflection region of each guide rail has a profile that has wave peaks arranged in a row (positive portion of a conventional sine function). Alternatively or in addition, the deflection region of each guide rail has a cauliflower profile. Other configurations are also conceivable, and combinations of the above embodiments.

The above embodiments allow the advantages and functions mentioned at the beginning.

According to one embodiment, the roller blind web is formed by a roller blind material to each of the opposite lateral edges of which a textile element is fastened. Each textile element has a guide portion that is guided in the guide channel of the corresponding guide rail. Each textile element bears on the corresponding deflection region and is guided out of the respective guide channel. The textile element is formed from a material that is typically different compared with the roller blind material and is in the form of a side strip. The textile element is connected fixedly, for instance in a materially bonded manner, to the roller blind material. The textile element is for example a textile strip made of material and is formed appropriately in a multiply folded-over or multi-ply manner for guidance in the guide channels. Alternatively, the textile element is a textile module, which is a textile strip with an additional reinforcing element. The reinforcing element serves for safe and stable guidance in the guide channels.

Particularly when the above-described textile elements are used, the abovementioned problems arise, these being largely avoided by the described adaptation of the guide rails.

According to one embodiment, the roller blind web is tensioned transversely to the extension direction at least while it is being wound up and unwound. Particularly in the case of roller blind webs that are under great tension, the problems mentioned at the beginning can be avoided particularly effectively. In particular, a considerable improvement in terms of noise emission during operation of the shading device is achieved in this way.

According to one embodiment, the deflection region of each guide rail is configured such that a distance between the roller blind web and the respective guide rail between the two deflection regions is so large that, in an operational state of the shading device, the roller blind web cannot come into contact with the guide rails. As a result of this distance adaptation or height adaptation, material knocking, as it is known, is avoided. In particular in the case of textile elements ultrasonically welded to the roller blind material, the material would otherwise lie very close to the guide rail, harden as a result of the welding operation and knock against the guide rail for example by being excited by driving profiles in the vehicle. Increasing the distance to a sufficient size contributes considerably toward reducing noise emission.

According to a further aspect, a guide rail for a shading device according one of the above-described embodiments is disclosed. The guide rail has a guide channel for displaceably guiding a roller blind web. The guide rail has an opening through which the roller blind web is guidable out of the guide channel along a deflection region. The guide rail is configured in the deflection region such that, in an operational state with a roller blind web, at least partial linear contact is able to be formed by the roller blind web.

According to a further aspect, a vehicle roof for a vehicle is disclosed, which has a shading device according to one of the above-described embodiments, which is coupled to the vehicle roof.

According to a further aspect, a vehicle is disclosed, which has an above vehicle roof, which is fixedly coupled to a roof body.

The guide rail, the vehicle roof and the vehicle according to the further aspects allow the abovementioned advantages and functions.

Further advantages and functions are described in the following, detailed description of an exemplary embodiment with the aid of the appended figures. Elements of identical construction or function are identified by the same reference signs throughout the figures.

BRIEF DESCRIPTIONS OF THE DRAWINGS

In the figures:

FIG. 5 shows a schematic cross-sectional view of a shading device according to one exemplary embodiment of the invention.

DETAILED DESCRIPTION

Figure 1:
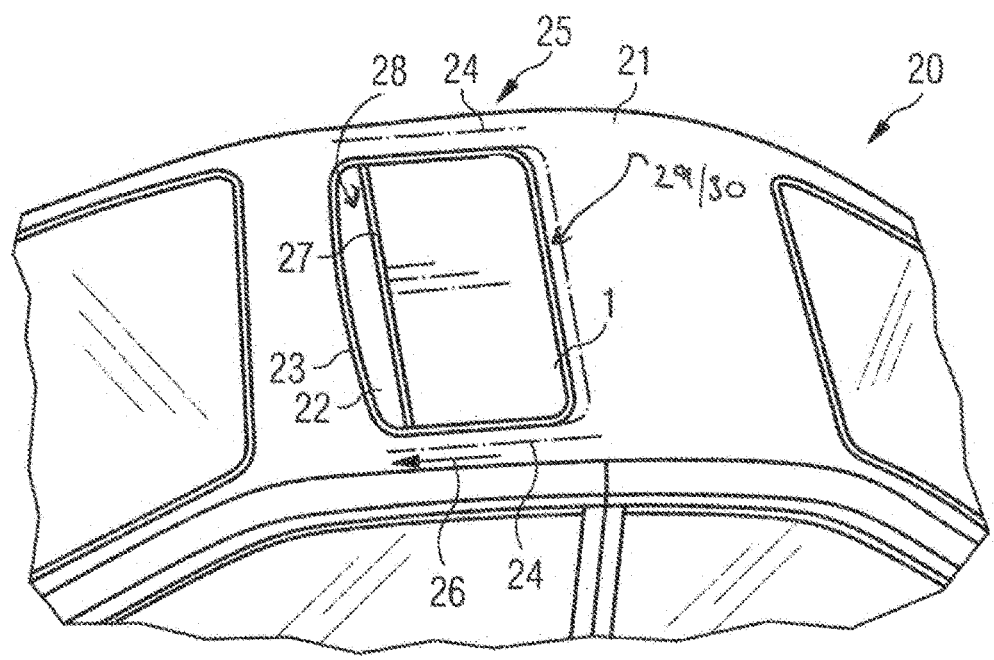
FIG. 1 shows a schematic, perspective view of a vehicle.

FIG. 1 shows a schematic view of a vehicle 20, which has a vehicle roof 21 that is provided with a roof opening 22. The vehicle roof 21 is fixedly coupled to the rest of a roof body. The roof opening 22 is selectively closable or at least partially openable by means of a displaceable sunroof cover. Alternatively, the roof opening 22 is permanently closed by means of a transparent roof element, for instance a panoramic roof. In this case, an immovable transparent roof element is provided. The roof opening 22 is delimited by a roof-opening frame 23 formed on the vehicle roof 21. The roof-opening frame 23 has guide rails 24 arranged on both sides, in which a shading device 25 is provided beneath the displaceable sunroof cover. The shading device 25 has a roller blind web 1, which can be displaced forward and in the opposite direction rearward in an extension direction 26, such that the roller blind web 1 is wound up and unwound. The extension direction 26 extends substantially parallel to a longitudinal axis of the vehicle 20. The roller blind web 1 serves to allow sunlight and ambient light into the vehicle 20 via the roof opening 22 or to prevent it from passing into the vehicle 20.

The roller blind web 1 is guided laterally in the guide rails 24 and extends between the latter at least while it is being wound up and unwound. The roller blind web 1 can be wound up entirely at a rear end with respect to the extension direction 26. To this end, provision is made for example of a winding device 29, which has a winding shaft 30 (also known as a roller blind shaft). The two last-mentioned elements are merely indicated schematically in FIG. 1. The roller blind web 1 is rolled up on the winding shaft 30 to form a roller blind winding, wherein the winding shaft 30 has a winding spring that applies tension in the extension direction 26 to the roller blind web 1 in order to tauten the latter (not illustrated). In order to extend or displace the roller blind web 1, at least one pulling bow 27 is optionally provided at a front end 28 of the roller blind web 1, said pulling bow 27 being provided for actuating the roller blind web 1.

Alternatively, the roller blind web 1 can also be actuated automatically, for example via an electrical device. It should also be mentioned that the winding device 29 can also be configured in some other way. For example, a winding shaft is not provided. The roller blind web 1 is thus rolled up to form the roller blind winding without a winding shaft. Furthermore, it is not absolutely necessary to provide a winding spring. The tension in the extension direction 26 can also be applied in some other way, for example via side guiding elements such as roller blind springs.

Figure 2:
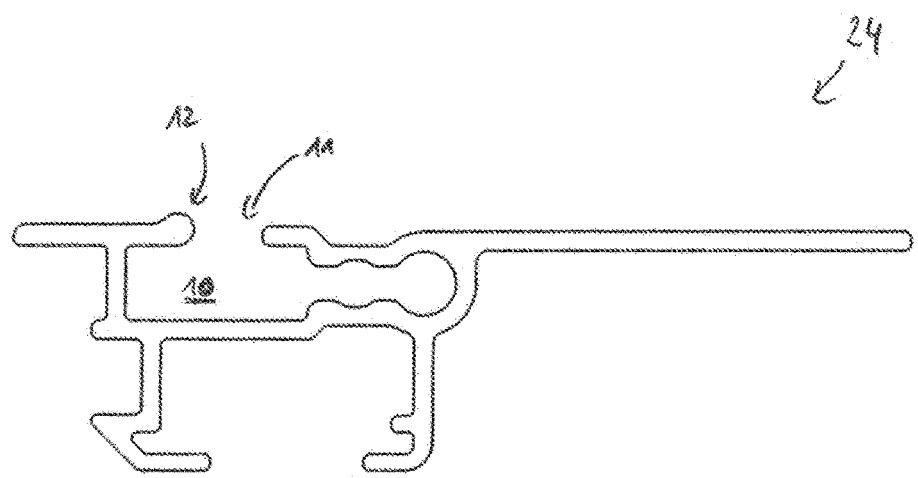
FIG. 2 shows a schematic cross-sectional view of a guide rail.

FIG. 2 schematically shows a cross section through a guide rail 24 according to one embodiment. The guide rail 24 has, in the extension direction 26 (normal to the plane of the image), a guide channel 10 that is configured for displaceably guiding the roller blind web 1. The guide rail 24 has an opening 11, out of which the roller blind web 1 extends to the opposite second guide rail. The guide rail 24 also has a deflection region 12, along which the roller blind web 1 bears in an operationally mounted state. The deflection region according to FIG. 2 is configured in a circular manner and allows the roller blind web to bear flat in operation.

Figure 3:
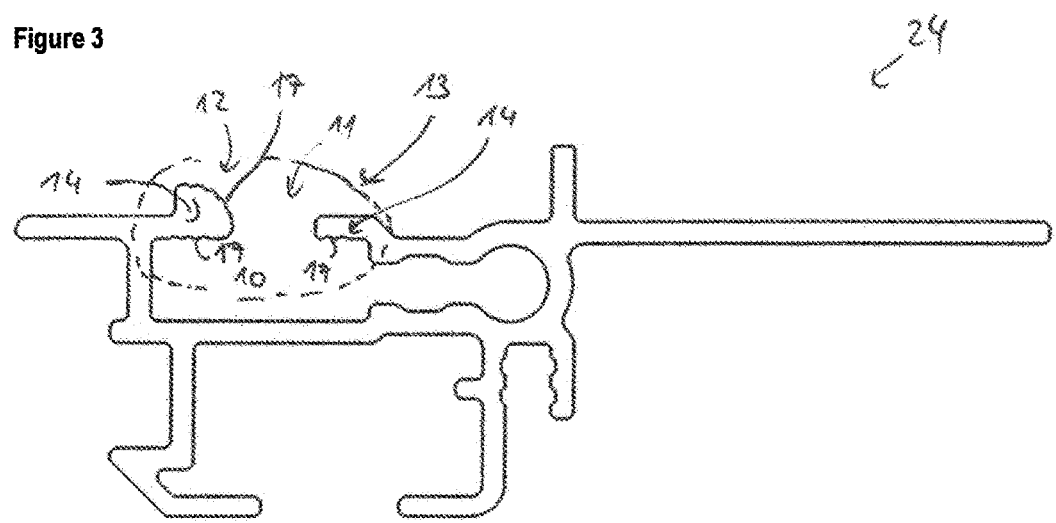
FIG. 3 shows a schematic cross-sectional view of a guide rail according to one exemplary embodiment of the invention.

FIG. 3 schematically shows a guide rail 24 according to one exemplary embodiment of the invention. In contrast to the previous guide rail, this has, in the deflection region 12, a wavy profile 17, which is characterized on the surface by small waves and grooves. The profile can also be referred to as a "cauliflower profile". As a result, a roller blind web does not bear extensively against the guide rail 24 in the deflection region 12 in the operational state, but at least partially in the form of linear contact.

Figure 4:
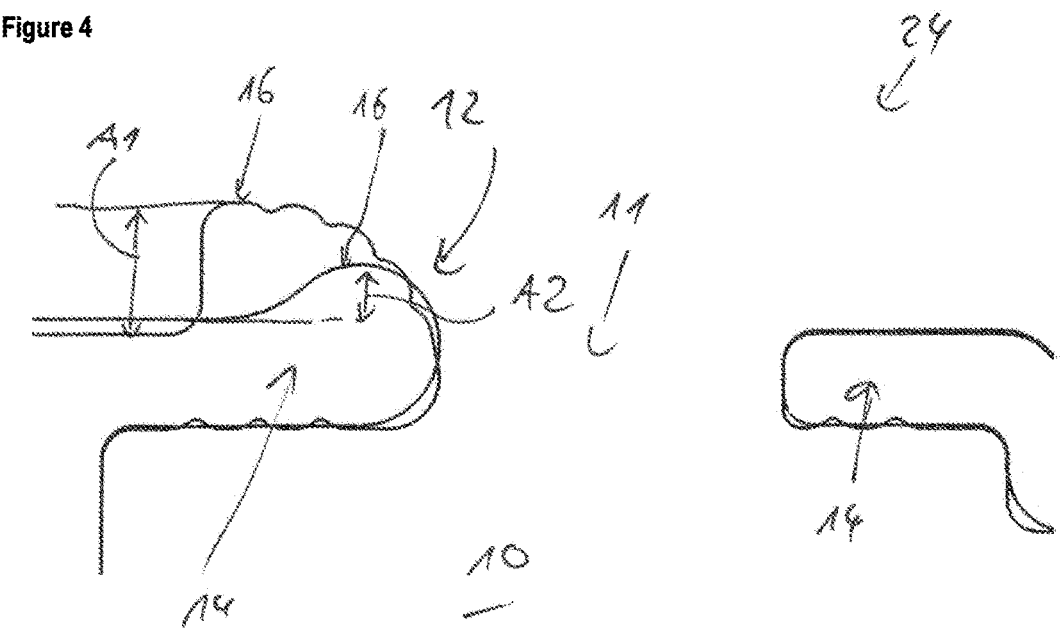
FIG. 4 shows an overlay of respective detail views of the guide rails according to FIGS. 2 and 3.

FIG. 4 shows the detail 13 in FIG. 3 on an enlarged scale, wherein the view is overlaid with an analogous detail view of FIG. 3. The two profile differences are illustrated here.

Note that also, as shown in FIGS. 3 and 4, upper portions 14 of the guide rail 24, which delimit the guide channel 10 and the opening 11, optionally likewise have on undersides 15 a wavy profile 17 with waves and grooves. The undersides 15 accordingly face an interior of the guide channel 10.

The guide rail 24 according to FIG. 3 allows the abovementioned advantages and functions.

Furthermore, a distance A1 between an upper edge 16 of the deflection region 12 and a part of the guide rail 24, which lies, during operation, between the deflection regions 12 of two guide rails 24, is enlarged compared with a distance A2 of the guide rail 24 according to FIG. 2. As a result, the material knocking mentioned at the beginning is avoided or at least reduced.

FIG. 5 shows a schematic cross-sectional view of a shading device 25 according to one exemplary embodiment of the invention with a roller blind web 1. The roller blind web 1 has a roller blind material 2 and, on opposite sides 5 that face the guide rails 24, in each case a textile element 3, which are formed in each case as a textile module with a reinforcing element 4, for instance a metal strip, and are fixedly connected to the roller blind material 2, for instance by means of ultrasonic welding. The textile elements 3 are attached to opposite lateral edges 6 of the roller blind material 1.

In the operational state, the roller blind web 1 is guided in the guide channels 10 of the two guide rails 24 by means of guide portions 7 of the textile elements 3 and extends between the two guide rails 24. In this case, the roller blind web 1 is tensioned transversely to the extension direction 26. The textile element 3 is guided in a form-fitting manner on the undersides 15 and is guided out of the guide channel 10 through the opening 11 in a closely bearing manner around the deflection region 12. On account of the corresponding profile of the deflection region 12, at least partial linear contact of the textile element 3 takes place.

The invention claimed is:

1. A shading device for a vehicle, comprising:
   a roller blind web and a winding shaft for winding up and unwinding the roller blind web in an extension direction, and
   guide rails that are arranged opposite one another and wherein each have a guide channel extending in the extension direction,
   wherein the roller blind web is guided in a displaceable manner in the extension direction on opposite sides in the guide channels of the guide rail while being wound up and unwound and extends between the guide rails such that the roller blind web is guided out of each guide channel along a deflection region in the direction of the respectively other guide channel,
   wherein the roller blind web bears on the associated guide rail in the respective deflection region,
   wherein each guide rail is configured in the deflection region such that at least partial linear contact is formed by the roller blind web, and
   wherein undersides of upper portions of the guide rails, which face an interior of the guide channels, have a wavy profile.

2. The shading device according to claim 1, wherein the deflection region of each guide rail has a wavy profile.

3. The shading device according to claim 1, wherein the deflection region of each guide rail has a profile that is formed at least partially by alternately arranged grooves and waves.

4. The shading device according to claim 1, wherein the roller blind web is formed by a roller blind material to each of the opposite lateral edges of which a textile element is fastened, wherein each textile element has a guide portion which is guided in the guide channel of the corresponding guide rail, and each textile element bears on the corresponding deflection region and is guided out of the respective guide channel.

5. The shading device according to claim 1, wherein the roller blind web is tensioned transversely to the extension direction at least while it is being wound up and unwound.

6. The shading device according to claim 4, wherein the deflection region of each guide rail is configured such that a distance between the roller blind web and the respective guide rail between the two deflection regions is so large that, in an operational state of the shading device, the roller blind material cannot come into contact with the guide rails.

7. A guide rail for a shading device according to claim 1, wherein the guide rail has a guide channel for displaceably guiding a roller blind web, and the guide rail has an opening through which the roller blind web is guidable out of the guide channel along a deflection region; wherein the guide rail is configured in the deflection region such that, in an operational state with a roller blind web, at least partial linear contact is able to be formed by the roller blind web.

8. A vehicle roof for a vehicle, comprising: a shading device according to claim 1, which is coupled to the vehicle roof.

9. A vehicle comprising: a vehicle roof according to claim 8, which is fixedly coupled to a roof body.

10. The shading device according to claim 1, wherein each guide rail is configured in the deflection region such that at least partial linear contact is formed by the roller blind such that along the extension direction a flat, extensive or smooth, contact is avoided.

11. A shading device for a vehicle, comprising:
   a roller blind web and a winding shaft for winding up and unwinding the roller blind web in an extension direction, and
   guide rails that are arranged opposite one another and wherein each have a guide channel extending in the extension direction,
   wherein the roller blind web is guided in a displaceable manner in the extension direction on opposite sides in the guide channels of the guide rail while being wound up and unwound and extends between the guide rails such that the roller blind web is guided out of each guide channel along a deflection region in the direction of the respectively other guide channel,
   wherein the roller blind web bears on the associated guide rail in the respective deflection region,
   wherein each guide rail is configured in the deflection region such that linear contact is formed by the roller blind web, and
   wherein undersides of upper portions of the guide rails, which face an interior of the guide channels, have a wavy profile.

* * * * *